United States Patent [19]
Savinsky

[11] Patent Number: 5,803,690
[45] Date of Patent: Sep. 8, 1998

[54] LOCKING SYSTEM FOR VEHICLE WHEELS

[76] Inventor: Stanislav Savinsky, 12-59 George St., Fairlawn, N.J. 07410

[21] Appl. No.: 827,179

[22] Filed: Mar. 27, 1997

[51] Int. Cl.[6] ............................. F16B 23/00; F16B 37/08
[52] U.S. Cl. ......................... 411/432; 411/402; 411/910; 411/919
[58] Field of Search ................................. 411/402, 427, 411/432, 910, 919

[56] References Cited

U.S. PATENT DOCUMENTS

| 4,742,702 | 5/1988 | Swertz | 411/910 X |
| 4,756,652 | 7/1988 | Hatter | 411/910 X |
| 4,867,624 | 9/1989 | Walley | 411/910 X |

FOREIGN PATENT DOCUMENTS

| 721585 | 3/1980 | U.S.S.R. | 411/910 |

*Primary Examiner*—Neill R. Wilson
*Attorney, Agent, or Firm*—Ilya Zborovsky

[57] ABSTRACT

A locking system for a vehicle wheel has a threaded member having a threaded part which has an axis and is screwable in a corresponding counter part, and a plurality of rings which are freely rotatable relative to the threaded part and having different eccentricities, and a key having an axis and a part engageable with the threaded member and is provided with a plurality of formations which engage the rings of the threaded member and have eccentricities similar to the eccentricities of the rings.

4 Claims, 1 Drawing Sheet

LOCKING SYSTEM FOR VEHICLE WHEELS

BACKGROUND OF THE INVENTION

The present invention relates to a locking system for vehicle wheels.

It is known that there are many instances when vehicle wheels or hub caps for vehicle wheels are removed by unauthorized persons and stolen. It is therefore advisable to provide such a locking system which will not allow an unauthorized person to remove a vehicle wheel or at least will make such removal extremely difficult.

SUMMARY OF THE INVENTION

Accordingly, it is an object of the present invention to provide a new locking system for vehicle wheels.

In keeping with these objects and with others which will become apparent hereinafter, one feature of the present invention resides, briefly stated, in a locking system which includes a threaded member for holding a vehicle wheel on a wheel disk or for holding a hub cap on a vehicle wheel, the threaded member having a threaded portion to be screwed with a corresponding part of the wheel hub or the vehicle wheel, and an outwardly extending part which includes a plurality of portions which are radially offset from one another; and a key which as a plurality of engaging portions which are correspondingly radially offset relative to one another and engageable with the portions of the outwardly extending part of the threaded member so as to engage the same and to unscrew the threaded member.

Wherein the system is designed in accordance with the present invention, only a special key can unscrew the threaded member and therefore the wheel or the wheel hub.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
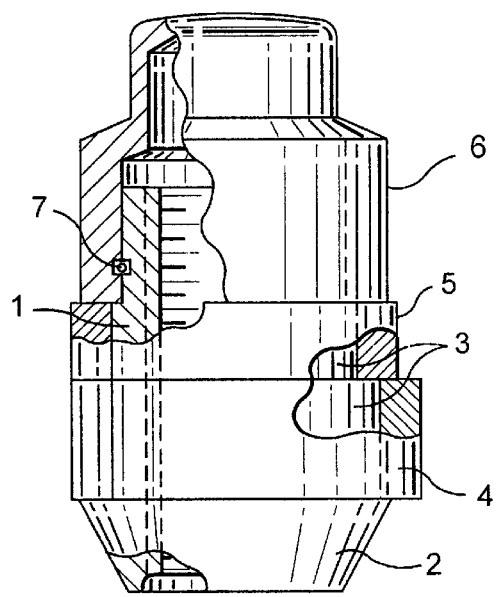
FIG. 1 is a view showing a partial cross-section of a wheel nut in accordance with the present invention.
Figure 2:
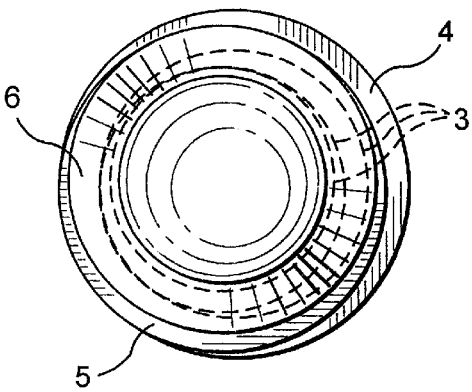
FIG. 2 is a view schematically showing a transverse cross-section of the portions of the outwardly extending part of the inventive nut.
Figure 3:
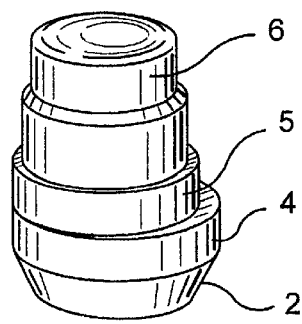
FIG. 3 is a perspective view of the nut in accordance with the present invention.

FIG. 1 shows a nut of a locking system for a vehicle wheel or a hub cap in accordance with the present invention. The nut has a threaded part which is identified as a whole with reference numeral 1 and provided with an inner threaded opening to be screwed on a threaded pin and the like. A lower end 2 of the threaded part 1 is formed as a standard cone or a semi-sphere. The threaded part 1 is stepped and has a plurality of cylindrical portions 3 with diameters reducing from a lower end to an upper end. The axes of the cylindrical portions are offset relative to one another in one direction perpendicular to the central axis or even in two directions which are perpendicular to the central axis as shown in FIG. 2. Cylindrical rings 4 and 5 are freely turnably arranged on the portions 3 of the threaded part 1 and have a uniform thickness over their periphery. The upper portion of the threaded member 1 and the upper ring or cup 6 are provided with aligned grooves and a retaining member 7 formed as a spring is located in the grooves.

The locking system further has a key which is identified with reference numeral 8. The key here is formed as a key with the inner opening engageable with the outer surface of the nut. The inner opening is provided with a plurality of steps 9 which are located one after the other in the axial direction and are transversely offset relative to one another exactly in correspondence with the offset of the corresponding portions of the nut, or more particularly in correspondence with the eccentricity shown in FIG. 2. The key 8 further has an engaging part 10 to be engaged by a tool. When the key 8 is fitted on the nut, the rings 4, 5, and 6 are received in the corresponding steps 9 of the central opening of the key. By turning the engaging part 9 formed here as a hexagon, by a tool, the key 8 is turned and can unscrew the nut from the threaded pin and the like. It is impossible to unscrew the nut by any other tool, since any tool which engages one of the rings 4, 5, and 6 will just turn the rings about their axis without unscrewing the whole nut.

Figure 4:
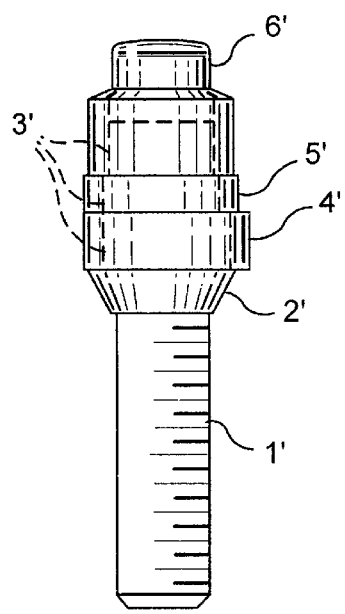
FIG. 4 is a view showing a wheel bolt in accordance with the present invention.
Figure 5:
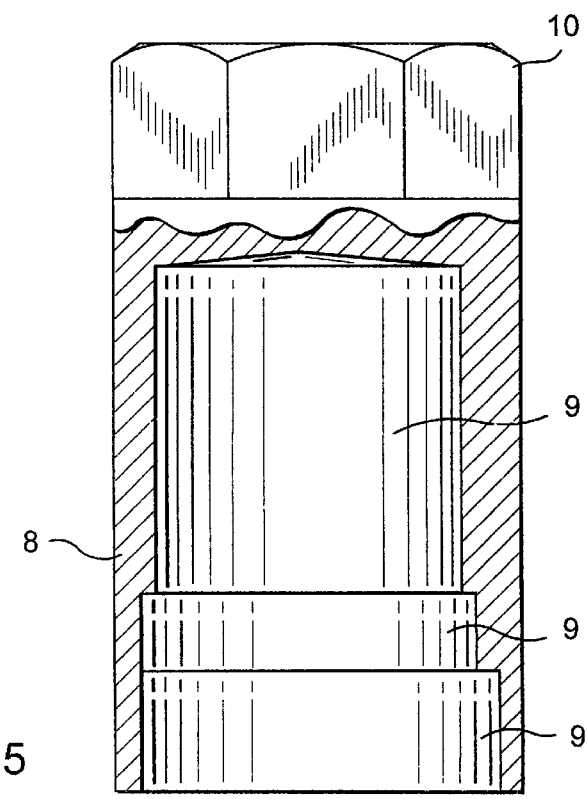
FIG. 5 is a view showing a section of a key for unscrewing the bolt or the nut in accordance with the present invention.

FIG. 4 shows a bolt of a locking system in accordance with the present invention. The bolt has a threaded part 1' which is screwable into a corresponding threaded opening. The head of the bolt is provided with a plurality of stepped portions 3' identical to the stepped portions 3 of the nut shown in FIG. 1, and a plurality of rings 4' and cup 5' are arranged on the stepped portions 3'. The lower end of the head is standard semi-spherical or conical. The bolt shown in FIG. 4 operates similarly to the nut shown in FIG. 1. The key 7 can unscrew the bolt from the threaded opening, while any other key engaging the rings 4, 5 will just turn the rings but not unscrew the threaded member as a whole.

It will be understood that each of the elements described above, or two or more together, may also find a useful application in other types of constructions differing from the types described above.

While the invention has been illustrated and described as embodied in locking system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims:

1. A locking system for a vehicle wheel, comprising a threaded member having a threaded part which has an axis and is screwable in a corresponding counter part, said threaded part having portions which are offset relative to one another in a direction perpendicular to said axis, and a plurality of rings which are freely rotatable relative to said threaded part on said portions; and a key having an axis and a part engageable with said threaded member and is provided with a plurality of formations which engage said rings of said threaded member and portions of said threaded part are offset relative to one another in said perpendicular direction exactly in correspondence with the offset of said portions.

2. A locking system as defined in claim 1, wherein said threaded member is a nut with said threaded part having an inner thread, said nut having a plurality said portions, each of said ring having a uniform thickness around their circumference and being freely turnably arranged on said portions.

3. A locking system as defined in claim 1, wherein said threaded member is a bolt having said threaded part as a threaded shaft; said bolt having a head with a plurality of said portions, said rings being freely rotably arranged on said portions of said head.

4. A locking system as defined in claim 1, wherein said key has a further shaped portion to be engageable by a tool for turning said key and therefore unscrewing said threaded member.

\* \* \* \* \*